United States Patent [19]

Brown

[11] Patent Number: 4,530,023
[45] Date of Patent: Jul. 16, 1985

[54] SOLID STATE INTERRUPT CIRCUIT

[75] Inventor: Leland T. Brown, Phoenix, Ariz.

[73] Assignee: Motorola, Inc., Schaumburg, Ill.

[21] Appl. No.: 507,655

[22] Filed: Jun. 27, 1983

[51] Int. Cl.³ .............................................. H02H 3/08
[52] U.S. Cl. ........................................ 361/58; 361/18;
361/101; 307/252 K; 307/252 Q; 323/908
[58] Field of Search .................. 361/93, 98, 101, 100,
361/58, 18, 111, 91; 323/908, 312, 315, 316,
278, 276, 311, 349, 277; 307/252 R, 252 K, 252
Q, 252 T, 254, 255, 264, 200 A, 131, 540

[56] References Cited

U.S. PATENT DOCUMENTS

| | | | |
|---|---|---|---|
| 3,263,128 | 7/1966 | White | 307/252 K X |
| 3,317,752 | 5/1967 | Zuk | 307/252 Q |
| 3,434,022 | 3/1969 | Byrd | 307/252 A X |
| 3,521,087 | 7/1970 | Lombardi | 323/312 X |
| 3,769,572 | 10/1973 | Doubt | 361/18 X |
| 3,996,498 | 12/1976 | Schade, Jr. | 361/18 |

Primary Examiner—Patrick R. Salce
Attorney, Agent, or Firm—Joe E. Barbee

[57] ABSTRACT

A pair of PNPN thyristors are used to provide a solid state fuze for circuit protection. One of the pair of thyristors is self-biased on and provides normal current flow. The other thyristor turns the first thyristor off during a surge condition. A current sensing resistor is placed in series with the first thyristor to provide bias to the second transistor. The circuit will automatically reset itself when the surge condition is no longer present.

3 Claims, 3 Drawing Figures

SOLID STATE INTERRUPT CIRCUIT

This invention relates, in general, to protective circuits, and more particularly, to a solid state line interrupt circuit to protect electronic equipment during a surge condition.

There are many circuit protective devices such as fuzes, circuit breakers, electronic fuzes and the like. Experiences with modern electronic PBXs, key telephone systems, electronic telephone as well as the forecast emergence of an Integrated Services Digital Network (ISDN) has placed even greater requirements on the part of protective circuits. This stems from the increased susceptibility of terminal equipment to damage from hazardous forms of interference such as lightning, power system, equipment power circuits, and local switching equipment.

With the advent of larger circuits being placed on integrated circuit chips it would be desirable to provide a protective circuit which can be fully integrated.

Accordingly, it is an object of the present invention to provide an improved solid state line interrupt circuit.

Another object of the present invention is to provide a solid state interrupt circuit which has automatic resettability and a faster trip action than mechanical systems.

Yet another object of the present invention is to provide a solid state line interrupt circuit which uses a pair of thyristors wherein one is self-biased on and the other turns the first off during a surge condition.

SUMMARY OF THE INVENTION

The above and other objects and advantages of the present invention are accomplished by providing a first thyristor in series between a first and a second terminal. The first thyristor is self-biased on. A second thyristor is coupled between the first terminal and the first thyristor and turns the first thyristor off during a surge condition. Current sensing means placed in series with the first thyristor provides the turn on bias for the second thyristor during the surge condition.

The subject matter which is regarded as the instant invention is set forth in the appended claims. The invention itself, however, together with further objects and advantages, thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DETAILED DESCRIPTION OF THE DRAWINGS

Figure 1:
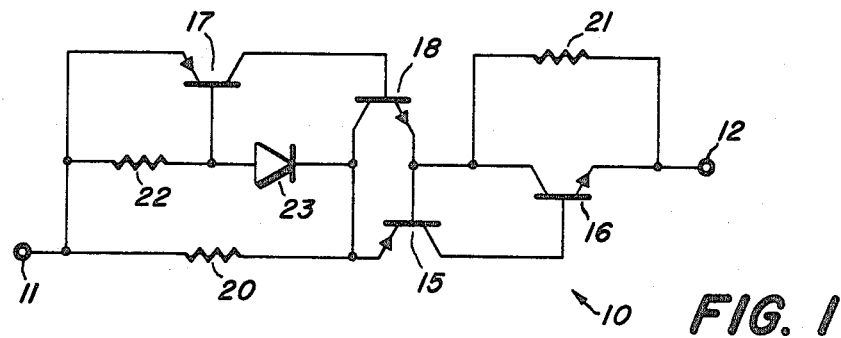
FIG. 1 illustrates in schematic form an embodiment of the present invention.

FIG. 1 illustrates in schematic form a solid state interrupt circuit 10 having an input terminal 11 and an output terminal 12. By designating the terminals "input" and "output" it is meant that current would normally flow from terminal 11 to terminal 12. Solid state interrupt circuit 10 is illustrated as having bipolar transistors; however, it should be noted that the transistors are interconnected in a manner to provide a first and a second thyristor. Transistors 15 and 16 are connected in an SCR configuration to provide the first thyristor and transistors 17 and 18 are interconnected to provide an SCR which serves as the second thyristor. A resistor 20 is coupled between terminal 11 and an emitter of transistor 15. The collector of transistor 15 is connected to the base of transistor 16. The base of transistor 15 is connected to the collector of transistor 16 and the emitter of transistor 16 is connected to terminal 12. This provides the first thyristor which is self-biased on by way of a resistor 21 which is coupled from the base of transistor 15 to terminal 12 thus appearing across transistor 16. Transistor 15 is a PNP transistor while transistor 16 is an NPN transistor, and they are both connected in a manner to provide SCR action. Transistor 17 has its emitter connected to terminal 11 and its collector connected to the base of transistor 18. A resistor 22 is coupled between terminal 11 and the base of transistor 17. A diode 23 couples the base of transistor 17 to the collector of transistor 18. The collector of transistor 18 is also connected to the emitter of transistor 15 while the emitter of transistor 18 is connected to the base of transistor 15. Transistor 18 is an NPN transistor which is interconnected with PNP transistor 17 to form an SCR configuration.

When a voltage first appears at terminal 11 it will build up to overcome the emitter to base voltage ($V_{BE}$) drop of transistor 15. The base of transistor 15 is coupled to terminal 12 by resistor 21 and therefore transistor 15 will commence to conduct. The initial path between terminals 11 and 12 is through resistor 20, the emitter-base junction of transistor 15, and through resistor 21. When transistor 15 conducts it will supply base current to transistor 16 which will cause transistor 16 to conduct. The current flow from terminal 11 to terminal 12 will then be through resistor 20, the emitter-collector of transistor 15, and also the emitter to base of transistor 15, through the collector-emitter of transistor 16, and through the base to emitter of transistor 16. Resistor 21 serves as the biasing means for transistor 15 and should be of a rather high ohmic value to not interfere with the operation of transistor 16 once it commences conduction.

The value of resistor 20 can be selected to provide the desired turn off level for solid state line interrupt circuit 10. Once the voltage across resistor 20 reaches the value of $2V_{BE}$, transistor 17 will commence to conduct. The voltage of twice $V_{BE}$ is needed to overcome the emitter to base voltage drop of transistor 17 and the forward voltage drop of diode 23. The conduction of transistor 17 will supply base drive for transistor 18 thereby causing transistor 18 to conduct. Conduction of transistor 18 results in robbing the bias drive for transistor 15 since the collector to emitter voltage drop of transistor 18 is less than the $V_{BE}$ drop of emitter to base junction of transistor 15. Once transistor 15 ceases its conduction then transistor 16 will also cease conduction leaving the only current path from terminal 11 to terminal 12 through transistors 17 and 18 and resistor 21. However, since resistor 21 is a high ohmic value the current flow from terminal 11 to terminal 12 will be greatly reduced.

Figure 2:
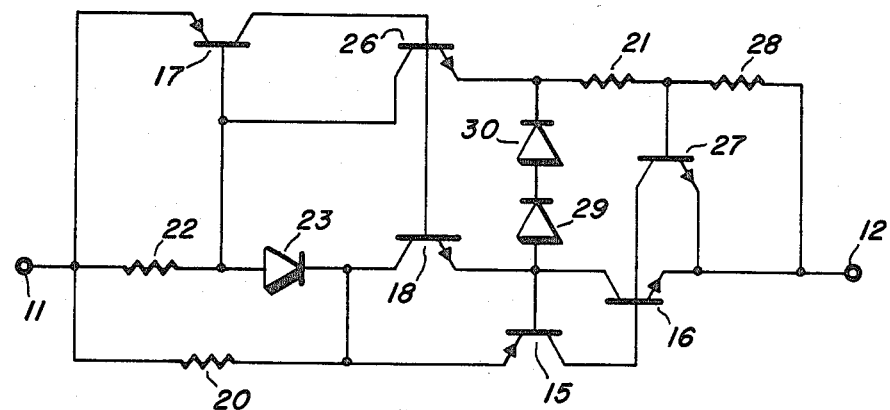
FIG. 2 illustrates in schematic form another embodiment of the present invention.

In certain cases there may be problems with keeping transistor 17 biased on during a surge condition. Also, leakage through transistor 15 may keep transistor 16 in a conductive state. Therefore, an additional embodiment of the present invention is shown in FIG. 2 which overcomes these potential problems. All the parts of the circuit of FIG. 1 which are shown in FIG. 2 carry the same reference numerals. Transistor 26 along with diodes 29 and 30 have been added to insure that the saturation condition of transistor 18 along with the voltage dropped across resistor 20 would not collapse the bias voltage required to keep transistor 17 conducting. Transistor 26 has its collector connected to the base of transistor 17, its base connected to the collector of transistor 17, and its emitter connected to resistor 21 and to the cathode of diode 30. Diodes 29 and 30 are connected in series with the cathode of diode 29 being connected to the anode of diode 30. The anode of diode 29 is connected to the emitter of transistor 18, the base of transistor 15, and the collector of transistor 16. Transistor 27 was added to insure that any leakage current from transistor 15 would not enable transistor 16 during a surge condition. Accordingly, the collector of transistor 27 is connected to the base of transistor 16 and to the collector of transistor 15 while the emitter of transistor 27 is connected to the emitter of transistor 16. In this manner the collector-emitter junction of transistor 27 will remove the bias from the base to emitter of transistor 16 when transistor 27 is conducting. Resistor 28 was added from terminal 12 to the base of transistor 27 in order to provide proper bias for transistor 27, when required, and it also completes the path for biasing resistor 21.

The operation of the circuit of FIG. 2 is the same as that described for FIG. 1. However, when transistor 17 is conducting it will also enable transistor 26 as well as transistor 18. The additional current pulled by transistor 26 through resistor 22 will insure that the bias developed by resistor 22 will maintain transistor 17 conductive. During a surge condition, the current flow through resistors 21 and 28 will be sufficient to enable transistor 27 so that if any leakage current occurs through transistor 15 it will not enable or keep transistor 16 partially biased on. Diodes 29 and 30 are used to insure that the conduction of transistor 26 will not cause transistor 18 to shut off. In a non-overload or non-surge condition the normal turn on conditions are the same as for FIG. 1 with the exception that initial bias for the base of transistor 15 is through diodes 29, 30 and resistors 21, 28 to terminal 12. Accordingly, this self-biasing feature of the thyristor (transistors 15 and 16) still exists and resistor 20 still provides the current sensing action to enable transistor 17 during a surge condition.

Figure 3:
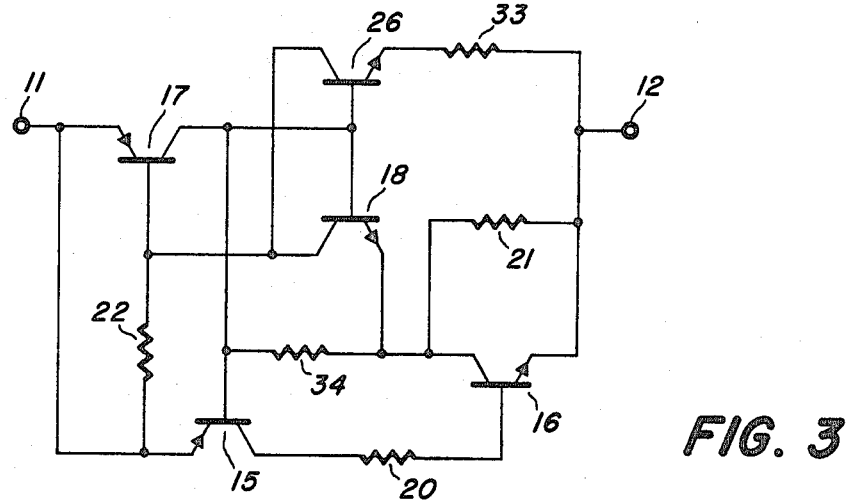
FIG. 3 illustrates in schematic form yet another embodiment of the present invention.

FIG. 3 illustrates yet another embodiment of the present invention. This embodiment uses less components than does the embodiment of FIG. 2 and also has a faster response time. Many of the elements of FIG. 3 carry the same reference numerals used in the previous embodiments particularly where the function performed is the same. Transistor 15 has its emitter connected to terminal 11 and its collector connected to resistor 20. Resistor 20 is also connected to the base of transistor 16. The collector of transistor 16 is coupled to the base of transistor 15 by a resistor 34. The emitter of transistor 16 is connected to terminal 12. Resistor 21 is coupled between the collector and emitter of transistor 16. Transistor 17 has its emitter connected to terminal 11 and its base coupled to terminal 11 by resistor 22. The base of transistor 17 is also connected to the collectors of transistors 18 and 26. The collector of transistor 17 is connected to the bases of transistors 15, 18, and 26. The emitter of transistor 18 is connected to the collector of transistor 16. The emitter of transistor 26 is coupled to terminal 12 by a resistor 33. Resistor 20 serves as a current sensing means and is selectable to determine the circuit trip point. It should be noted that resistor 20 could be a current device which could improve the circuit operation in certain applications.

When a voltage is applied to terminal 11, it will build up to overcome the base-to-emitter voltage ($V_{BE}$) drop of transistor 15 which will cause transistor 15 to conduct. Note that the base of transistor 15 is coupled to terminal 12 by resistors 34 and 21. Conduction of transistor 15 will cause transistor 16 to conduct until thyristor action occurs thereby saturating transistors 15 and 16. The voltage dropped across current device or resistor 20 will increase as the current conduction increases. If it is assumed that the saturation collector-emitter voltage of transistors 15 and 16 is zero then the voltage dropped across resistor 20 will appear across resistor 34 since the $V_{BE}$ voltage of transistors 15 and 16 cancel out. Once the voltage across resistor 34 exceeds the $V_{BE}$ voltage of transistor 18, transistor 18 will conduct thereby drawing current through resistor 22 and forward biasing transistor 17. Transistors 17 and 18 will form thyristor action, and transistor 17 will remove the bias from transistor 15 since the collector-emitter of transistor 17 appears across the emitter-base of transistor 15. When transistor 15 ceases to conduct, transistor 18 will start to lose its bias, but transistor 26 will be enabled. Transistors 17 and 26 will then form a thyristor and their conduction will keep transistor 15 and 16 from conducting until the overload condition appearing across terminals 11 and 12 is removed.

By now it should be appreciated that there has been provided a solid state line interrupt circuit using a pair of thyristors wherein one is self-biased on and the other turns the first one off during a surge condition. The solid state line interrupt circuit has automatic resettability and is particularly useful in PBX systems. The solid state line interrupt circuit lends itself to being fully integrated on a semiconductor chip. Also, a second solid state line interrupt circuit can be added in parallel with and in a back-to-back configuration with a first solid state interrupt circuit to obtain a bidirectional interrupt circuit.

Although more than one embodiment of the invention has been illustrated, it will be apparent to those skilled in the art that yet other modifications to the circuit could be made without departing from the teaching of the invention. As an example, in FIG. 2, diode 23 could be eliminated thereby leaving the collector of transistor 18 connected only to the emitter of transistor 15. Also, diode 30 could be replaced by a short and a resistor could be added from the base of transistor 17 to the base of transistor 15. These changes to the embodiment of FIG. 2 will result in less voltage drop between terminals 11 and 12 during normal operation. Accordingly, it is intended that the accompanying claims cover all modifications that come within the spirit and scope of the invention.

I claim:

1. A solid state interrupt circuit for limiting current flow when an overload condition occurs and having a first and a second terminal, comprising: a first resistor coupled to the first terminal; a first transistor having a first current carrying electrode coupled to the first resistor; a second transistor having a first current carrying electrode coupled to a control electrode of the first transistor, the second transistor further having a control electrode coupled to a second current carrying electrode of the first transistor, and having a second current carrying electrode coupled to the second terminal; a third transistor having a first current carrying electrode coupled to the first terminal, and having a control electrode and a second current carrying electrode; a fourth transistor having a first current carrying electrode coupled to the first current carrying electrode of the first transistor and coupled to the control electrode of the third transistor, the fourth transistor further having a control electrode coupled to the second current carrying electrode of the third transistor, and having a second current carrying electrode coupled to the control electrode of the first transistor; and means for providing a passive resistance coupled between the first current carrying electrode of the second transistor and the second current carrying electrode of the second transistor.

2. The solid state interrupt circuit of claim 1 further including a second resistor coupled between the first terminal and the control electrode of the third transistor; a diode coupled from the control electrode of third transistor to the first current carrying electrodes of the first and fourth transistors; a fifth transistor having a first current carrying electrode coupled to the control electrode of the third transistor, having a control electrode coupled to the second current carrying electrode of the third transistor, and having a second current carrying electrode coupled to the means for providing a passive resistance; at least one diode coupled between the second current carrying electrodes of the fourth and fifth transistors; a sixth transistor having a first current carrying electrode coupled to the second current carrying electrode of the first transistor, having a control electrode coupled to the means for providing, and having a second current carrying electrode coupled to the second current carrying electrode of the second transistor so that the control electrode and second current carrying electrode junction of the sixth transistor is between the means for providing and the second current carrying electrode of the second transistor; and a third resistor coupled between the control electrode of the sixth transistor and the second terminal.

3. The solid state interrupt circuit of claim 1 wherein the means for providing a passive resistance is a resistor, and all the transistors are bipolar transistors.

* * * * *